(12) United States Patent
Endoh et al.

(10) Patent No.: US 11,414,141 B2
(45) Date of Patent: Aug. 16, 2022

(54) STRUCTURE FOR ATTACHING UNDERCOVER TO VEHICLE BODY

(71) Applicant: UNIPRES CORPORATION, Yokohama (JP)

(72) Inventors: Katsuhisa Endoh, Fuji (JP); Takafumi Endo, Fuji (JP)

(73) Assignee: UNIPRES CORPORATION, Yokohama (JP)

( * ) Notice: Subject to any disclaimer, the term of this patent is extended or adjusted under 35 U.S.C. 154(b) by 454 days.

(21) Appl. No.: 16/621,081

(22) PCT Filed: Jun. 12, 2018

(86) PCT No.: PCT/JP2018/022334
§ 371 (c)(1),
(2) Date: Dec. 10, 2019

(87) PCT Pub. No.: WO2018/230538
PCT Pub. Date: Dec. 20, 2018

(65) Prior Publication Data
US 2020/0198708 A1 Jun. 25, 2020

(30) Foreign Application Priority Data
Jun. 12, 2017 (JP) .............................. JP2017-115079

(51) Int. Cl.
*B62D 35/02* (2006.01)
*B60R 13/08* (2006.01)
(Continued)

(52) U.S. Cl.
CPC .......... *B62D 35/02* (2013.01); *B60R 13/0861* (2013.01); *B62D 27/065* (2013.01); *F16B 5/0241* (2013.01); *B60R 13/0815* (2013.01)

(58) Field of Classification Search
CPC ............ B60R 13/0815; B60R 13/0861; B62D 25/2072; B62D 27/065; B62D 35/02
(Continued)

(56) References Cited

U.S. PATENT DOCUMENTS

| 10,077,011 B1* | 9/2018 | Gur ...................... B60R 13/0861 |
| 2014/0070562 A1* | 3/2014 | Inagaki .............. B62D 25/2072 |
| | | 296/180.1 |
| 2015/0336615 A1* | 11/2015 | Lim ........................ B62D 35/02 |
| | | 296/180.1 |

FOREIGN PATENT DOCUMENTS

| FR | 3099124 A1 * | 1/2021 | |
| FR | 3099744 A1 * | 2/2021 | ............. B62D 35/02 |

(Continued)

OTHER PUBLICATIONS

International Search Report with English translation and Written Opinion issued in corresponding application No. PCT/JP2018/022334 dated Aug. 7, 2018.

*Primary Examiner* — Jason S Daniels
(74) *Attorney, Agent, or Firm* — Foley & Lardner LLP

(57) ABSTRACT

An undercover (31) for rectifying airflow under a floor of a vehicle while driving the vehicle includes screw pedestals (42) for fixing screws (41) or nut pedestals for nuts, which are served as fastening points to a vehicle body (29). Interference caps (58) which are a molded product made from an elastic resin material are fitted between the adjacent pedestals. Under a state that the undercover (31) is engaged with and is attached to the vehicle body by the screws, a top portion (60) of the interference caps (59) is elastically deformed and is abutted to the opposite vehicle body surface, and the above abutment is maintained. Small clearance between the undercover and the vehicle body are maintained, and interference between the undercover and the vehicle due to vibration while driving is prevented, without (Continued)

changing the number of fastening points of the undercover to the vehicle body.

16 Claims, 13 Drawing Sheets

(51) Int. Cl.
    *B62D 27/06*     (2006.01)
    *F16B 5/02*     (2006.01)

(58) Field of Classification Search
    USPC .................................................. 296/38, 180.1
    See application file for complete search history.

(56) References Cited

FOREIGN PATENT DOCUMENTS

| | | |
|---|---|---|
| JP | S56-146712 A | 11/1981 |
| JP | S61-107692 U | 7/1986 |
| JP | 3269197 B2 | 3/2002 |
| JP | 2006-160023 A | 6/2006 |
| JP | 2007-145097 A | 6/2007 |
| JP | 2010-208578 A | 9/2010 |
| KR | 10-2013-0120074 A | 11/2013 |

\* cited by examiner

STRUCTURE FOR ATTACHING UNDERCOVER TO VEHICLE BODY

TECHNICAL FIELD

The present invention relates to a structure for attaching an undercover to a vehicle body to rectify airflow under a floor driving a vehicle.

BACKGROUND ART

An undercover is attached under the floor of the vehicle to improve an aerodynamic characteristic of the driving vehicle by rectifying the airflow (Patent Document 1). Attaching the undercover with the vehicle body is provided by disposing screw holes or studs on the vehicle body and fastening screws or nuts from the undercover side. The amount of attaching points of the undercover with the vehicle body is limited by the cost (restriction in the number of components) and man-hours in an assembling process (restriction of operation time). Hence, there is a limit to shorten the intervals between the attaching points of the undercover in the vehicle body. To eliminate the concerns that the undercover interferes with the vehicle body between the mounting points caused by the long attachment pitch, a sufficient clearance between the undercover and the vehicle body is needed around the outer circumferential portion of the undercover which is the most proximal portion of the undercover. The undercover is the component which works as a sound insulation layer against for propagation of the noise into the cabin from under the floor of the vehicle. Sound absorption materials are adopted on the undercover against the propagation of the noise through the clearance between the undercover and the vehicle body.

Further, Patent Document 2 discloses a resin press molding method (a so-called injection process) using direct charging which is adopted to the mold of the undercover according to an embodiment of the present invention.

THE LIST OF PRIOR ART DOCUMENTS

Patent Documents

Patent Document 1: Japanese Patent No. 3269197 B2
Patent Document 2: Japanese Unexamined Patent Publication No. S56-146712 A

SUMMARY OF THE INVENTION

Problems to be Solved by the Invention

The countermeasure by adopting the sound absorption materials for the noise which comes through the clearance between the undercover and the vehicle body causes the cost-up problems by added materials and affix process. So, the alternative noise reduction countermeasure without using the sound absorption materials which provides the same effect as using the sound absorption materials was desired.

The inventors confirm an improvement in the sound insulation performance by reducing the clearance size of the outer circumferential portion of the undercover to the vehicle body. In simply reducing the clearance as the countermeasure, the interference described above will occur.

In view of the technical problems as mentioned above, the purpose of the present invention is to reduce the clearance between the undercover and the vehicle body, while achieving a cabin noise level equivalent as the current specification using the sound absorbing materials by no sound absorbing material and without increasing the number of the attaching points to prevent interference with the vehicle body while driving.

Means for Solving the Problems

The present invention relates to a mounting structure for attaching an undercover, which rectifies an air flow under the floor while driving, to a vehicle body with screws. The undercover has the pedestals toward the vehicle body at every attaching point with the vehicle body, and a shock absorbing member for contact with the vehicle body is provided between those pedestals, so it makes possible to reduce the clearance of noise entrance between the vehicle body without increasing the attaching points but the undercover does not interfere with the vehicle body directly while driving.

The portion under the vehicle floor where the undercover is located could be overlapped with the exhaust gas tubes. Since the undercover made of resin must have a distance from the high temperature exhaust gas tubes to avoid deformation by heat, the undercover may have a partially hollowed shape along the exhaust gas tubes to avoid interference. In such cases, the clearance between the undercover and the vehicle body at the hollowed shaped portion could not be small. However, it is possible to form ribs for providing a mounting base for the shock absorbing members nearby the hollowed shaped portion of the undercover. The rib forming portions enable to reduce the clearance between the undercover and the vehicle body, and the concern of interference with the vehicle body due to reduction of the clearance can be solved by providing the shock absorbing members on the ribs.

Further, according to the present invention, at least the tip portion of the shock absorbing members that abut on the opposite side of the vehicle body can be made of an elastic body. When attaching the undercover to the vehicle body, since the tips of the shock absorbing members are appropriately and elastically deformed, the small clearance between the undercover and the vehicle body are maintained and the undercover can surely be abutted to the vehicle body through the shock absorbing members.

Effects of the Invention

The present invention can realize the equivalent sound insulation performance as the conventional structure of providing the sound absorbing materials without using the sound insulation material by reducing the clearance between the undercover and the vehicle body at the clearance management necessary portion.

Since these intrusions can make noise by impacting the vehicle floor due to vibration while driving, in this sense the present invention is the excellent countermeasure for noise reduction.

Furthermore, since the number of the attachment points to the vehicle body is invariant with respect to that of the prior art, the operation tact in an assembling line is invariant and influence against the man-hour in the assembling process is not occurred.

The present invention does not impair the original function of rectifying the air flow under the floor.

Even if the cost increases due to installation of the shock absorbing members, the present invention realizes the total cost reduction by omitting the sound absorbing materials.

BRIEF DESCRIPTION OF THE DRAWINGS

In the accompanying drawings:

FIG. 9A shows a state before the shock absorbing cap is attached to the outer circumferential wall of the undercover, and FIG. 9B shows a state after the shock absorbing cap is attached to the outer circumferential wall of the undercover;

FIG. 10A shows a state before the shock absorbing cap is attached to the internal rib, and FIG. 10B shows a state after the shock absorbing cap is attached to the internal rib;

FIG. 17A shows a state before the nonwoven fabric tape contacts with the vehicle body, and FIG. 17B shows a state after the nonwoven fabric tape of the outer circumferential wall is affixed to the vehicle body.

MODE FOR CARRYING OUT THE INVENTION

Embodiments of the present invention will be described as follows. These embodiments are directed to a noise countermeasure by forming a sound insulation space in which a small clearance to a vehicle body is maintained around an overall circumference of an undercover or a substantially overall circumference of the undercover. An original gist of the present invention is an idea that the clearance between the undercover and the vehicle body, which can suppress the noise in a vehicle interior, are formed without changing the number of fastening points of the undercover to the vehicle body, an interference between the undercover and the vehicle body due to an input of a vertical vibration while driving is prevented, and shock absorbing members are disposed at spaces between the fastening points, which are noise propagation portions, in order to suppress the noise. Needless to say, the present invention is not intended to be limited to the embodiments described below.

Figure 1:
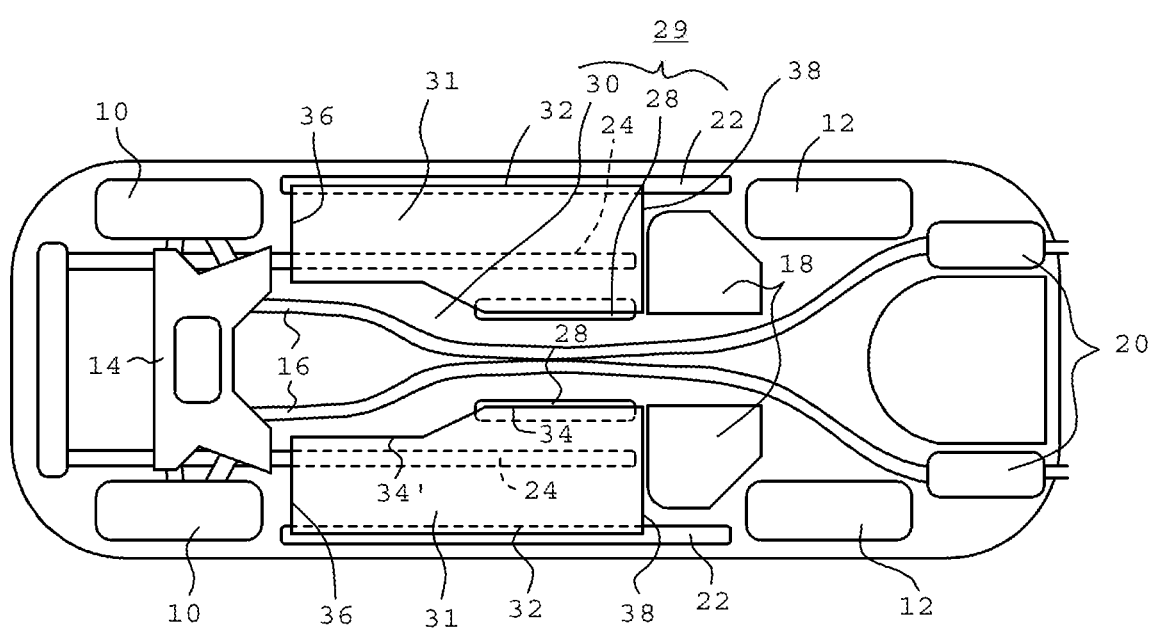
FIG. 1 is a schematic view of a bottom surface of a vehicle.

FIG. 1 schematically shows a bottom surface of the vehicle. The reference numeral 10 denotes front wheels, the reference numeral 12 denotes rear wheels, the reference numeral 14 denotes a sub frame for installing an engine (a V-type engine in the present invention), the reference numeral 16 denotes two exhaust gas tubes extending from both left and right sides of the V-type engine, the reference numeral 18 denotes a fuel tank, the reference numeral 20 denotes mufflers, the reference numeral 22 denotes side sills, the reference numeral 24 denotes side members, and the reference numeral 28 denotes a floor center frame. The reference numeral 29 denotes an overall vehicle body portion in a vehicle interior lower-surface side, and the overall vehicle body portion 29 comprises the side sills 22, the side members 24, the floor center frame 28 and a floor panel 30. The reference numeral 31 denotes an undercover for a lower surface of the vehicle interior floor according to the present embodiment, and the undercover 31 has left and right portions in order to avoid the exhaust gas tubes (the dividing position is dependent on a layout of the exhaust gas tubes), covers the lower surface portion of the vehicle interior in the vehicle body, and has a flat shape in order to reduce a wind noise by a rectification effect that is an original object in which the undercover 31 is disposed. As described below in detail, forming a sound insulation space S that is substantially closed to an exterior and is disposed between the undercover 31 and the vehicle body portion 29 which comprises the side sills 22, the side members 24, the floor center frame 28 and the floor panel 30 in the lower surface side of the vehicle interior, is intended to reduce the noise level in the vehicle interior (refer to FIGS. 3, 4 and 6), as the present invention is embodied.

Figure 2:
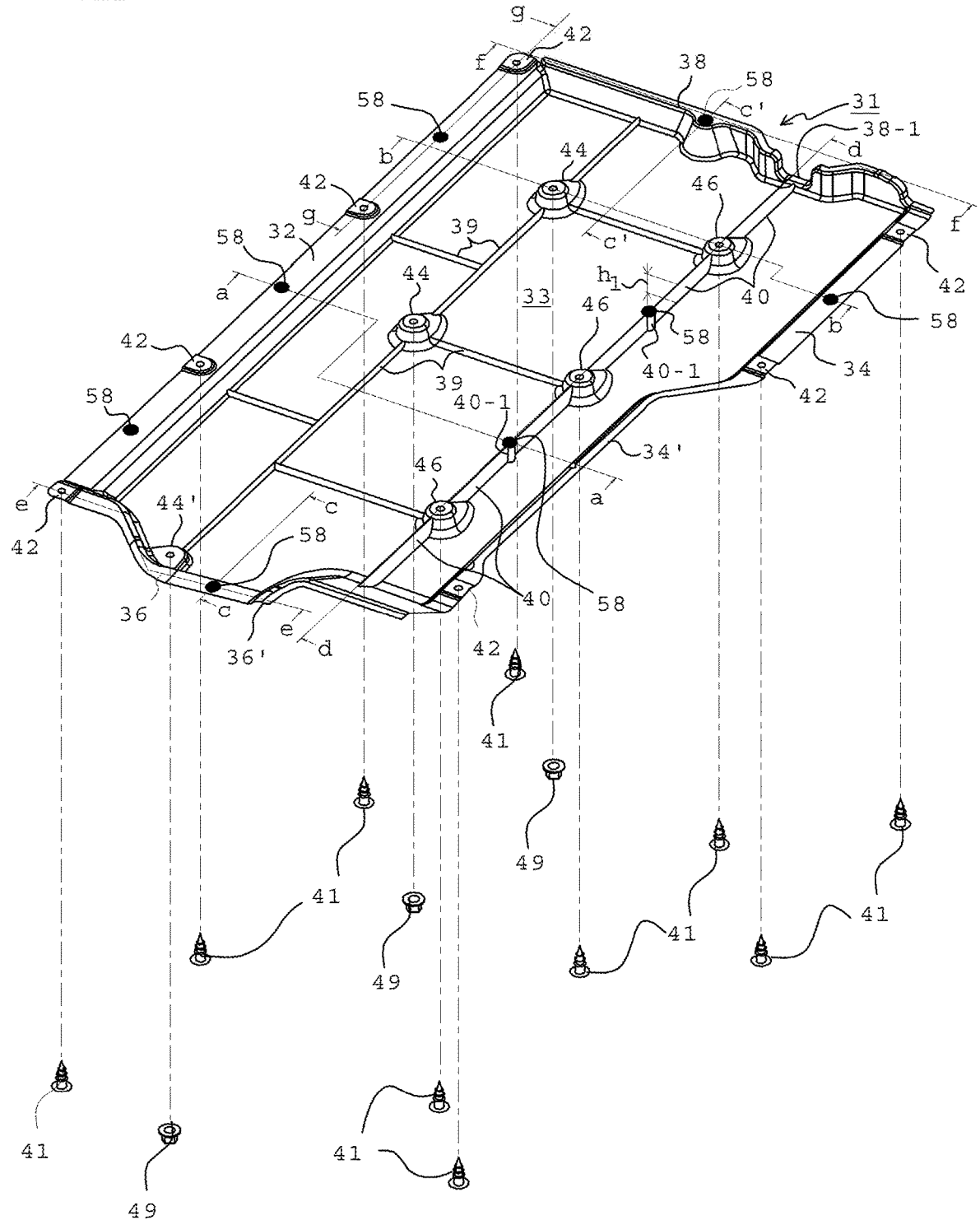
FIG. 2 is a perspective view of an undercover according to an embodiment of the present invention.

FIG. 2 is a perspective view showing the undercover 31. The undercover 31 is engaged with the vehicle body bottom surface in the vehicle interior which is positioned above the undercover 31, from the bottom through screws and nuts, as described below. The undercover 31 of FIG. 2 denotes the left side of the vehicle body that is depicted in the below one in FIG. 1. The undercover 31 for the right side that is depicted in the above one in FIG. 1 is substantially the same configuration as that for the left side. The undercover 31 is made from a non-expensive synthetic resin such as polypropylene. In the present embodiment, the undercover 31 are manufactured by a so-called injection process which is described in Patent Document 2. That is, in the press molding process of the undercover depending on the injection process, the synthetic resin materials such as polypropylene are melted, the kneaded resin is filled with a lower die of the opened die press which has a product shape pattern using an extruding machine, an upper die is lowered, the upper and lower dies are clamped, the resin is filled with the die cavity, the upper and lower dies are cooling down, the molded product is ejected from the molding press, and then the undercover 31 which is the molded product is manufactured.

Figure 3:
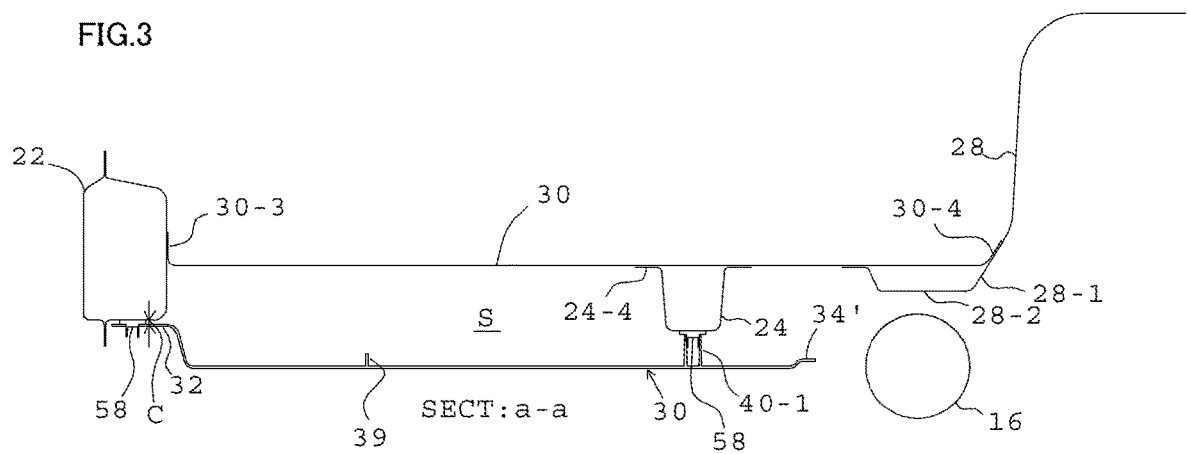
FIG. 3 is a cross-sectional view, taken along a cutting line a-a, in a state that the undercover of FIG. 2 is attached to the bottom surface of the vehicle.
Figure 4:
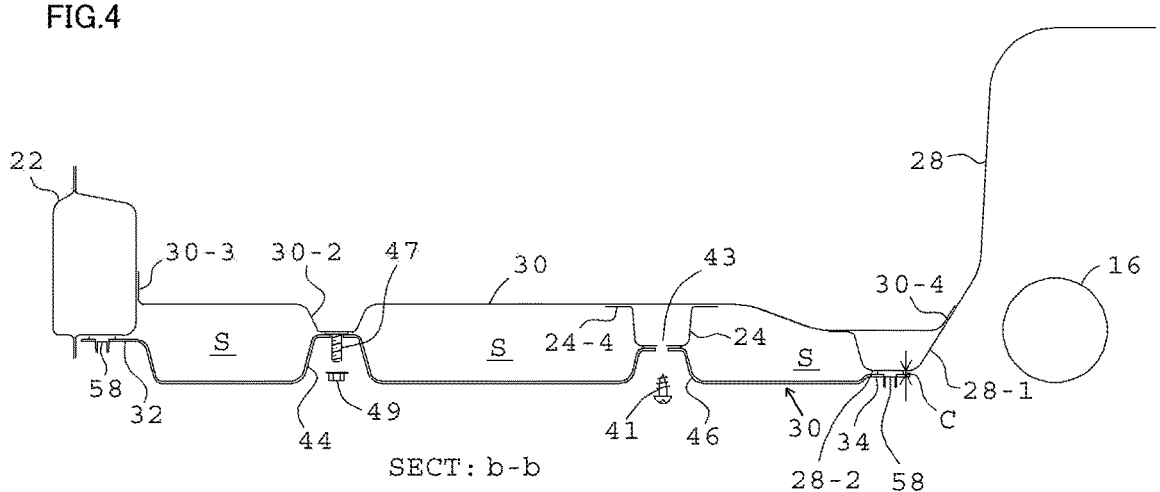
FIG. 4 is a cross-sectional view, taken along a cutting line b-b, in a state that the undercover of FIG. 2 is attached to the bottom surface of the vehicle.
Figure 6:
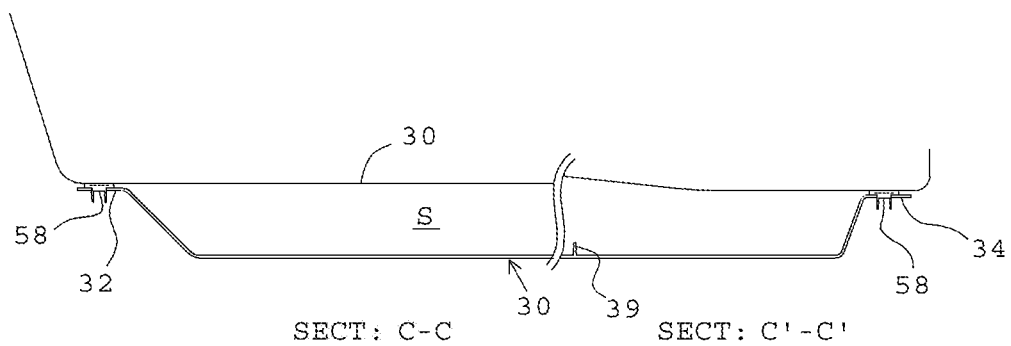
FIG. 6 is a cross-sectional view, taken along cutting lines c-c and c'-c', in a state that the undercover of FIG. 2 is attached to the bottom surface of the vehicle.
Figure 7:
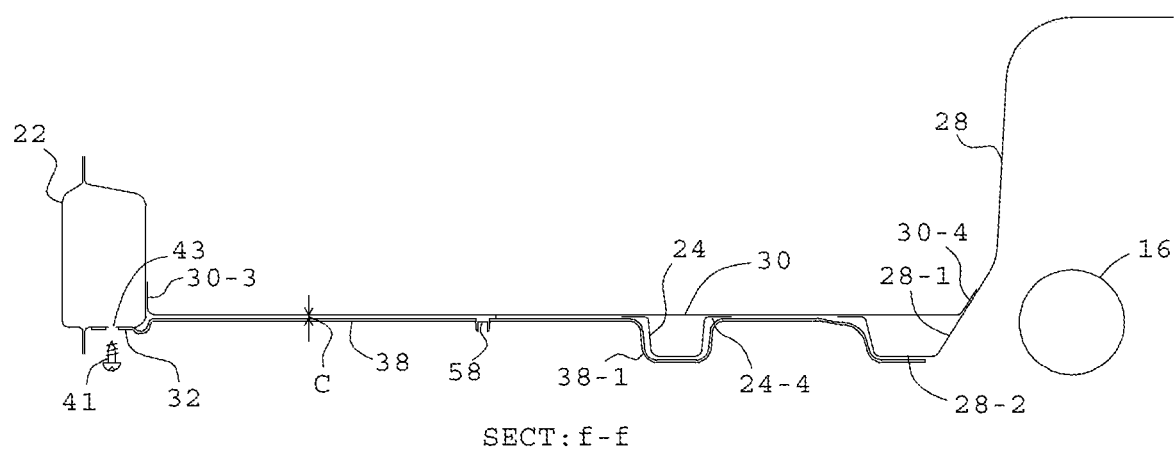
FIG. 7 is a cross-sectional view, taken along a cutting line f-f, in a state that the undercover of FIG. 2 is attached to the bottom surface of the vehicle.
Figure 8:
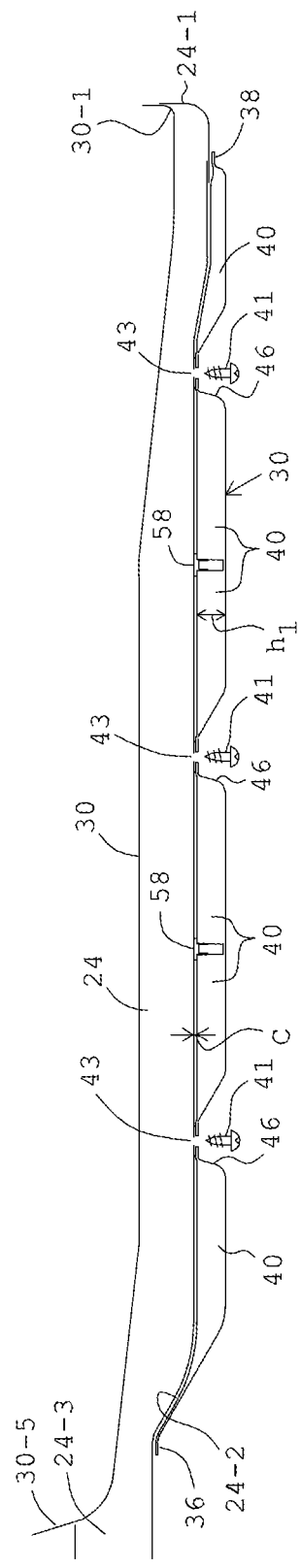
FIG. 8 is a cross-sectional view, taken along a cutting line d-d, in a state that the undercover of FIG. 2 is attached to the bottom surface of the vehicle.

The structures of the vehicle body portions in the lower surface of the vehicle interior to which the undercover 31 is attached will be described with respect to the present invention in detail. FIG. 3 to FIG. 8 are cross-sectional views, taken along the cutting lines which are indicated by lower-case alphabets of FIG. 2, in a case that the undercover 31 is engaged with the vehicle body-lower surface using the fixing screw members (screws 41 and nuts 49). In FIG. 3 to FIG. 8, the floor panel 30 is configured to the vehicle interior floor surface, and is a press molded product of a steel sheet. The side sills 22 are channel materials with a flange in which the flanges are welded so that the spaces of the channel materials are faced, have a trapezoidal shape, are extended to a longitudinal direction of the vehicle interior (a vertical direction of FIGS. 3, 4, 5 and 7) and are welded to vehicle interior door-side end portions 30-3 of the floor panel 30. Vehicle interior center portion-side ends 30-4 of the floor panel 30 are welded to the floor center frame 28. The floor center frame 28 has a curved shape to the vehicle interior side (the upper side of FIGS. 3 and 4). From FIG. 4, it is understood that the exhaust gas tubes 16 are disposed below the curved portion of the floor center frame 28. As shown in FIGS. 3, 4, 5 and 7, vehicle interior side portions 28-1 of the floor center frame 28 are disposed below the floor panel 30, and tunnel shape spaces are formed. As described below, the bottom surfaces 28-2 of the vehicle interior side portions 28-1 are attachment portions of the outer circumferential walls 34 of the undercover 31 (FIG. 4). As shown in FIGS. 3, 4, 5 and 7, the cross-sectional surface of the side members 24 has a hat shape, and upper flange portions 24-4 of the side members 24 are welded to the lower surface of the floor panel 30. FIG. 8 shows a cross-sectional shape of the side member 24 extending to the longitudinal direction (a left or right direction in FIG. 8) along the lower surface of the floor panel 30. The floor panel 30 has a flat panel at the vehicle interior portion, is slightly and downwardly tilted toward the rear portion of the vehicle, and upwardly forms the curved portion closed end surface 30-1 which is opposite to the fuel tank 18 (FIG. 1). The floor panel 30 is upwardly tilted toward the front of the vehicle interior, and has an upward tilt surface 30-5 (an attachment surface of foot pedals) at the front surface of the vehicle interior. As shown in FIG. 8, in the front and rear direction of the vehicle interior, the upper surface of the side member 24 (a leg portion 24-4 having a hat shape (the welded portion to the floor panel 30) in FIGS. 3, 4, 5 and 7) has a shape which is taken along the lower surface shape of the floor panel 30 in contact. The rear closed end 24-1 of the vehicle body is welded to the opposite surface 30-1 of the floor panel 30. The front portion 24-3 of the vehicle body has an upward portion along the shape of the floor panel 30. The lower surface of the side member 24 forms an upwardly curved portion 24-2 at front of the front portion 24-3.

In FIG. 2, the attachment surface of the undercover 31 to the vehicle body is shown upwardly. As described below, in order to avoid the interference between the undercover 31 and the exhaust gas tubes, and protect the resin from a high temperature radiant heat from the exhaust gas tubes, the undercover 31 has a hollowed out portion 34' (FIG. 1), and has a rectangular shape as a whole viewed from the top surface, comprises the bottom surface 33 and the outer circumferential walls 32, 34, 36 and 38, which are four sides and are slightly projected from the bottom surface 33 to the vehicle body-lower surface, and has a opened shallow box shape. The outer circumferential wall 34 has the hollowed out portion 34' where the exhaust gas tube 16 is proximate. This is because the interference between the undercover 31 and the exhaust gas tube 16 is avoided (refer to also FIG. 3). The outer side surface (the downward surface in FIG. 2) of the undercover 31 is molded to an almost flat surface (FIGS. 3, 4 and 6) in order to reduce a running resistance and an aerodynamic noise caused by the irregular air flow due to the projections and the recesses of the outer side surface of the undercover 31 while driving. Orthogonal reinforcing ribs 39 and 40 are formed on the bottom surface 33 of the undercover 31 shown in FIG. 2. The ribs 39 are disposed for reinforcing the undercover. Hence, the height of the ribs 39 is low (refer to also FIGS. 3 and 6). As described below, the ribs 40 are disposed for reinforcing the undercover 31 and forming the shield space S (the sound insulation space S) by the undercover 31, and have a height "$h_1$". In a state that the undercover 31 is attached to the vehicle body, the ribs 40 are extended to the front and rear direction (the longitudinal direction) along the side members 24 of the vehicle body (FIG. 8). As shown in FIG. 2, the upper surface of the undercover 31 in which the ribs 39 and 40 are disposed is engaged with the vehicle body using the fixing screw members (the thirteen fixing screw members are used in the present invention). As described below, the fixing screws 41 are inserted from the bottom, and are fastened to the screw holes 43 in the projection portions of the vehicle body bottom surface (FIGS. 4, 5, 7 and 12). Studs 47 are hanged down from the vehicle body side, and are fastened by the nuts 49 from the bottom (refer to FIG. 3). The fastened portions of the undercover to the vehicle body by the fixing screws 41 and the nuts 49 are the fastening points of the undercover 31 to the vehicle body. In the present embodiment, as shown in FIG. 2, ten fastening points for the fixing screws 41 and three fastening points for the nuts 49 are disposed. That is, as a whole, thirteen fastening points are disposed. In the undercover 31, the insertion portions of the fixing screws 41 form the screw pedestals (the pedestals for the fixing screw members in the present invention). In FIG. 2, the screw pedestals are formed as a flat-type on the outer circumferential walls 32, 34 and 36, and the reference numeral 42 denotes the screw pedestals (refer to also FIG. 12). Three screw pedestals are formed on the outer circumferential wall 32, three screw pedestals are formed on the outer circumferential wall 34 and 34', and one screw pedestal is formed on the outer circumferential wall 36. Seven flat-type screw pedestals 42 are disposed on the outer circumferential walls 32, 34 and 36. When the undercover 31 is attached to the vehicle body using the screws 41, the screw pedestals 42 are abutted to the vehicle body-opposite surface. The outer circumferential walls 32 and 34 are flat over the overall length. The clearance C having a height "$h_2$" (FIG. 12) to the flat vehicle body-opposite surface are existed in rest portions of the outer circumferential walls 32, 34, 36 and 38 except for the abutment portions of the screw pedestals 42. In this embodiment of the present invention, the setting value of the clearance C (a central value within a tolerance range) is set to, for example, 3 [mm]. The sound insulation space is formed in an inner portion of the undercover 31 on an inner side of the outer circumferential walls 32, 34, 36 and 38. The soundproof effect in this sound insulation space in which the sound absorbing materials are not used can obtain the same as the effect obtained in the space in which the sound absorbing materials are used. As shown in FIG. 2, in order to be engaged with the undercover bottom surface 33 to the vehicle body, three screw pedestals 46 having a boss shape are disposed in series. As described below, the screw pedestals 46 having the boss shape are fastened to the side member 24 by the screws (FIG. 8). With respect to the nuts 37 as the fixing screw members, the fastened portions of the vehicle body side are not the projection portions such as the side sills 22 and the side members 24, but are the floor surface directly. In order to avoid breaking through the floor surface by the screws, the studs 47 which are welded to the vehicle body and are hanged down the vehicle body are fastened by the nuts 37. The fastened portions by the nuts 37 are the boss-shape nut pedestals 44 and 44' (the pedestals for the fixing screw members in the present invention) which are projected from the bottom surface of the undercover 31 to the vehicle body-opposite surface. The nut pedestals 44 and 44' are disposed in series, and are the same boss shape as the screw pedestals 46. The two nut pedestals 44 disposed on the undercover 31 are abutted to the local emboss portions 30-2 which are formed on the vehicle body bottom surface 33 in the vehicle body front and rear direction (the longitudinal direction) (FIG. 4). The one nut pedestal 44' which is proximate to the rest outer circumferential wall 36 is abutted to the bottom surface of the floor panel 30. As shown in FIG. 2, the boss-shape pedestals 44, 44' and 46 for the fixing screw members (the screws or the nuts) are the base points of the orthogonal direction ribs 39 and 40 disposed on the inner bottom surface of the undercover 31. The studs 47 are welded to the abutment portions of the emboss portions 30-2 to the nut pedestals 44 and to the abutment portion of the floor surface to the nut pedestal 44'. The studs 47 are downwardly projected from openings of the upper surfaces of the nut pedestals 44 and 44'. The structure that the nuts 49 are screwed and are fixed to the studs 47 from the bottom side of the undercover 31 is adopted (with respect to the nut pedestals 44, refer to FIG. 4).

As shown in FIG. 2, the three boss-shape screw pedestals 46 are formed in alignment with the vehicle body front and rear direction. As shown in FIG. 8, the three boss-shape screw pedestals 46 are abutted to the opposite bottom surface of the side member 24. The ribs 40 having the height "$h_1$" which are integrally extended from the screw pedestals 46 along the vehicle body front and rear direction, that is, the side member 24, in a state that the undercover 31 is attached to the vehicle body, are set to the same predetermined clearance C (FIG. 8) between the outer circumferential walls 32, 34, 36 and 38 and the opposite surface of the vehicle body opposite portion. In FIG. 2, the outer circumferential wall 34 has the hollowed out portion 34' in the inner side of the undercover 31. In order that the interference between this hollowed out portion 34' and the exhaust gas tube 16 is avoided, as shown in FIG. 3, the hollowed out portion 34' cannot be continued to the vehicle body, and cannot construct the shield structure. The ribs 40 which are proximate to this hollowed out portion 34' of the outer circumferential wall 34 are extended between the outer circumferential wall 36 disposed at the front portion of the undercover 31 and the outer circumferential wall 38 disposed at the rear portion of the undercover 31. Thereby, in a state that the undercover 31 is attached to the vehicle body, the predetermined clearance C between the ribs 40 and the opposite surface of the side member 24 is maintained over the whole circumference of the shield spaces S.

Figure 5:
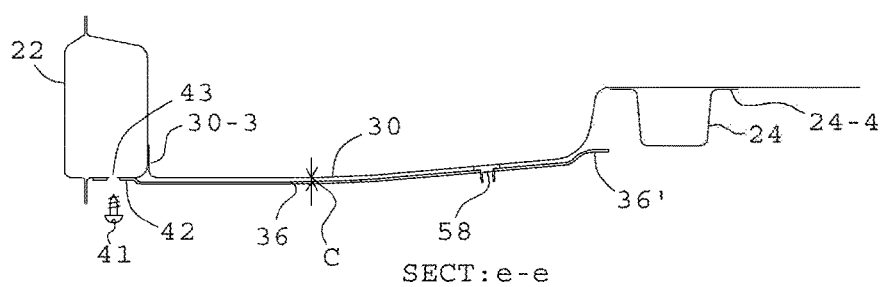
FIG. 5 is a cross-sectional view, taken along a cutting line e-e, in a state that the undercover of FIG. 2 is attached to the bottom surface of the vehicle.

The position relationship between the respective outer circumferential walls 32, 34, 36 and 38 of the undercover 31 and the opposite surface of the vehicle body will be described. At first, the outer circumferential wall 32 along the outer side of the vehicle body in the undercover 31 is oppositely disposed to the lower surface of the side sill 22. The four flat-type screw pedestals 42 are formed on the surface of the outer circumferential wall 32 opposite to the side sill 22 (FIGS. 3, 4 and 7). The screws 41 are screwed to the screw holes 43 of the side sill 22 through the flat-type screw pedestals 42. Thereby, the predetermined clearance C between the surface of the outer circumferential wall 32 and the opposite surface, which is corresponding to the height "$h_2$" of the flat-type screw pedestals 42 (FIG. 12), can be set (with respect to the predetermined clearance C between the outer circumferential wall 32 and the opposite surface of the vehicle body (the side sill 22), refer to also FIG. 3). With respect to the outer circumferential wall 34 along the inner side of the vehicle body in the undercover 31, the two flat-type screw pedestals 42 are disposed. The outer circumferential wall 34 is attached to the opposite surface of the vehicle interior side portion 28-2 in the floor center frame 28 by the screws 41 with the predetermined clearance C. As well as the case of the outer circumferential wall 32, the predetermined clearance C depending on the height "$h_2$" of the flat-type screw pedestals 42 can be set (with respect to the clearance C of the outer circumferential wall 34, refer to also FIG. 4). In the hollowed out portion 34' of the outer circumferential wall 34, the clearance to the vehicle body-opposite surface cannot be set to a preferred value in embodying the present invention, which is 3 [mm]. Alternatively, the ribs 40 which are proximate to and are along the inner side of the hollowed out portion 34' are served as the circumferential wall 34, and the predetermined clearance C between the ribs 40 and the lower surface of the side member 24 can be set (FIG. 8). With respect to the outer circumferential wall 36 of the vehicle body front portion side in the undercover 31, as shown in FIG. 5, the outer circumferential wall 36 is extended from the one flat-type screw pedestal 42 in which the outer circumferential wall 36 is fixed to the bottom surface of the side sill 22 by the screw 41 in the vehicle body front portion side, to the end portion 36' which is existed in front of the side member 24, along the opposite surface of the vehicle body, that is, the floor panel 30. The predetermined clearance C between the outer circumferential wall 36 and the opposite surface of the vehicle body is maintained. With respect to the outer circumferential wall 38 of the vehicle body rear portion side in the undercover 31, as shown in FIG. 7, since the outer circumferential wall 38 is transverse to the side member 30 and the floor center frame 28, the outer circumferential wall 38 has a complicate shape for maintaining the predetermined clearance C. The outer circumferential wall 38 is extended from the one flat-type screw pedestal 42 in which the outer circumferential wall 38 is fixed to the bottom surface of the side sill 22 by the screw 41 in the vehicle body rear portion side, to finally the bottom surface 28-2 of the vehicle interior side portion 28-1 in the floor center frame 28, via a complementary shape portion 38-1 which is complemented with the side member 24 and the floor panel 30. The predetermined clearance C between the outer circumferential wall 38 and the opposite surface of the vehicle body is maintained. Since the outer circumferential walls 32, 34, 36 and 38 of the undercover 31 have an above-described structure to the vehicle body-opposite surface, the undercover 31 can be set to the predetermined clearance C to the vehicle body-opposite surface over the substantially whole circumference of the outer circumferential portion. Thereby, the undercover 31 can form the sound insulation space S which is shielded by the inner side of the outer circumferential walls 32, 34, 36 and 38 and the plural ribs 40 over the whole circumference and the substantially whole circumference (FIGS. 3, 4 and 6), and can realize an excellent soundproof function. Here, the substantially whole circumference is meant as follows. In a case that the undercover has the locally elongated clearance because the opposite bottom surface of the vehicle body has a complicate projection and recess structure, if the above elongated clearance is not affected to the sound insulation effect, the present invention includes the above undercover having the locally elongated clearance. In a state that the undercover is attached to the lower surface of the vehicle body, the lower surface of the undercover 31 has a substantially flat surface (FIGS. 3, 6 and the like). This contributes to reduction of the wind noise, and can also contribute to reduction of the noise level in the vehicle interior. That is, the original function of the undercover 31 is the rectification function of the air flow under the floor of the vehicle while driving. In the structure of the present invention, while the lower surface of the undercover 31 has a conventional structure, the original function of the undercover 31, that is, the rectification effect is not at all degraded.

Figure 9A:
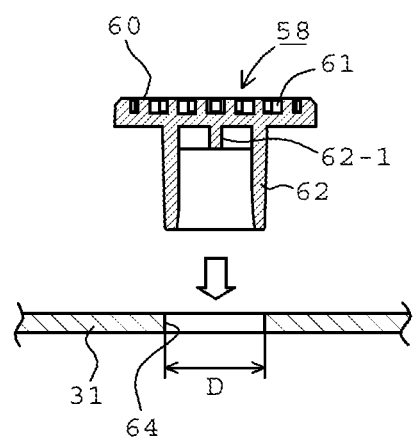
FIGS. 9A and 9B are cross-sectional views of a shock absorbing cap for attaching to an outer circumferential wall of the undercover according to the embodiment of the present invention.
Figure 9B:
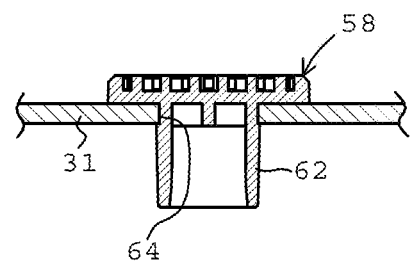
Figure 10A:
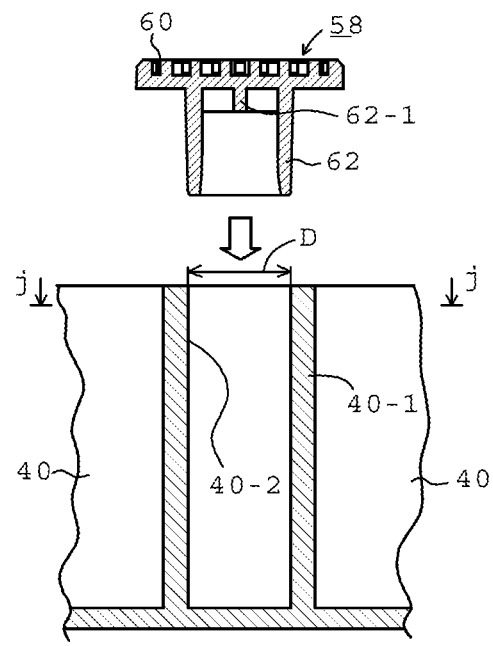
FIGS. 10A and 10B are cross-sectional views of the shock absorbing cap for attaching to an internal rib of the undercover according to the embodiment of the present invention.
Figure 10B:
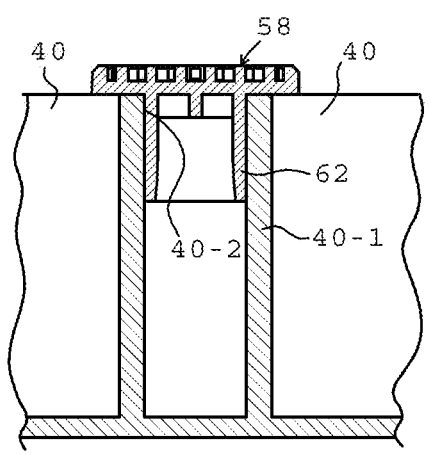
Figure 11:
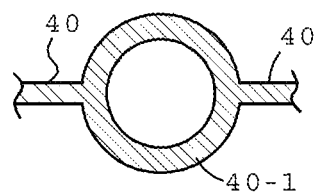
FIG. 11 is a cross-sectional view, taken along a cutting line j-j of FIG. 10A.

In the present invention, the shock absorbing means are disposed between the outer circumferential walls 32, 34, 36 and 38 and the vehicle body-opposite surface. Thereby, the predetermined clearance C is maintained. In spite of the restriction in the intervals of the fixing screw members (the screws 41 and the nuts 49), that is, the restriction in the total numbers of the fastening points and the vibration while driving, even if the vibration when the vehicle is driving is generated, the interference can be prevented and the hitting noise cannot be occurred. Hereinafter, these shock absorbing means will be described. In FIG. 2, the reference numeral 58 denotes the shock absorbing caps (the shock absorbing means of the present invention). Eight shock absorbing caps are disposed on the outer circumferential walls 32, 34, 36 and 38 and the ribs 40 which are opposite to the vehicle body-opposite surface. According to the present invention, the shock absorbing caps 58 are disposed between the proximate pedestals 44, between the proximate pedestals 44' and 46, and between the proximate pedestals 46 along the outer circumference of the sound insulation space S. Here, the pedestals 44, 44' and 46 are those of the screw fastening members for the screws 41 and the nuts 49. As shown in FIGS. 9A, 9B, 13A and 13B, the shock absorbing caps 58 are the synthetic resin molded products composed of the elastic material having an appropriate elasticity modulus, and comprise a disk shape portion 60 and a slightly-tapered cylindrical leg portion 62. An inner diameter "D" of an attaching hole 64 which is disposed in the undercover 31 is slightly smaller than an outer diameter of the cylindrical leg portion 62 at a root side. By elastically deforming the cylindrical leg portion 62 and pushing the cylindrical leg portion 62 to a position where the lower surface of the top portion 60 is abutted to the upper surface of the undercover 31, as shown in FIG. 9B, the cylindrical leg portion 62 is slightly contracted in the diameter at the attaching hole 64, and has the original outer diameter at a position extending from the attaching hole 64. Thereby, the shock absorbing caps 58 can be held to the attaching holes 64. As shown in FIG. 9A, a diameter-direction rib 62-1 which is disposed on the bottom surface of the top portion 60 and is extended to the inner circumference of the cylindrical leg portion 62 (the rib 62-1 has a cross-shape and the cross is intersected at a center of the cylindrical leg portion 62), is formed. As shown in FIG. 9B, the height and the width of the rib 62-1 are set so that rigidity for having an appropriate bite to the inner circumference of the attaching hole 64 is obtained in a state that the undercover 31 is inserted. As described below, the top portion 60 forms cutout portions 61 which are a compressing margin when the top portion 60 is elastically deformed. As shown in FIG. 2, the shock absorbing caps 58 are attached on the ribs 40. FIGS. 10A and 10B are described in the structure for attaching the shock absorbing cap 58 to the rib 40. That is, the ribs 40 have two bottomed cylindrical portions 40-1 for attaching the shock absorbing caps 58 at the midpoint between the adjacent boss-shape screw pedestals 46. As shown in FIG. 11, a position relationship that the ribs 40 are extended from the opposite position in a diameter direction is established. As shown in FIG. 10A, the upper surface of the cylindrical portion 40-1 has an opening shape. The opening 40-2 of the cylindrical portion 40-1 is a straight hole whose inner diameter is "D". The outer diameter at the root side of the tapered cylindrical leg portion 62 of the shock absorbing cap 58 is slight larger than the inner diameter "D" of the opening 40-2 of the cylindrical portion 40-1. By pushing the shock absorbing cap 58 into the cylindrical portion 40-1, the cylindrical leg portion 62 is slightly and elastically contracted in the diameter at the root side. Thereby, as shown in FIG. 10B, the lower surface of the top portion 60 can be abutted to the upper surface of the rib 40. In a press-fitting state, the shock absorbing cap 58 can surely be held to the cylindrical portion 40-1 under the elastic force by contracting the diameter of the cylindrical leg portion 62.

Figure 12:
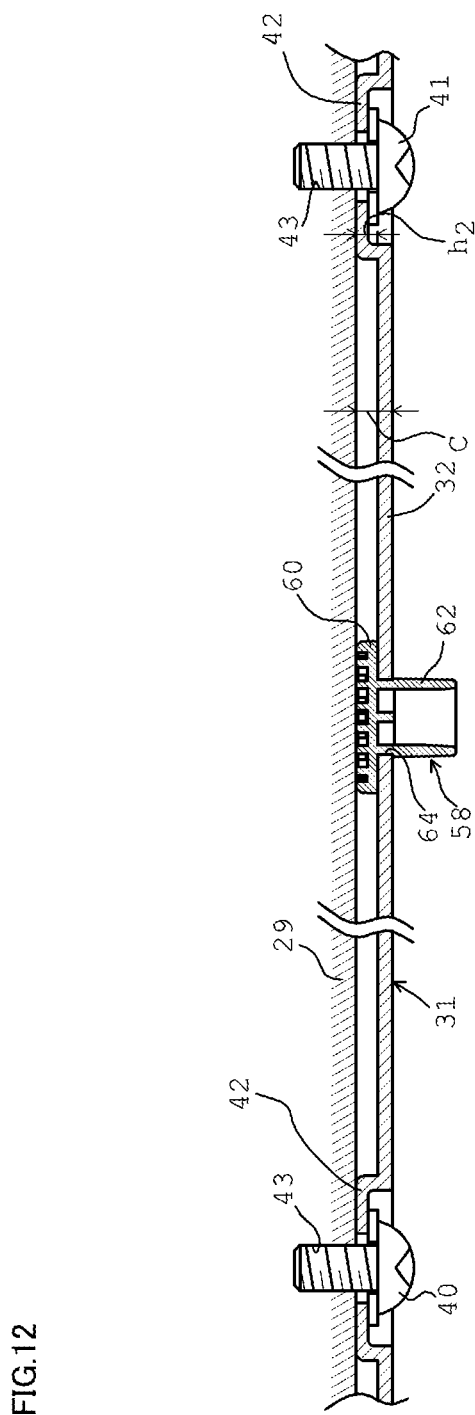
FIG. 12 is a cross-sectional view, taken along a cutting line g-g of FIG. 2 and shows an enlarged state that the undercover is attached to a vehicle body side sill.
Figure 13A:
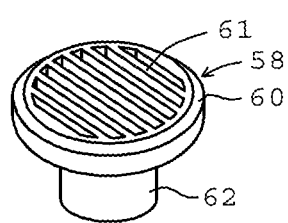
FIG. 13A is a perspective view of the shock absorbing cap and FIG. 13B is a plan view of a cylindrical portion of the shock absorbing cap.
Figure 13B:
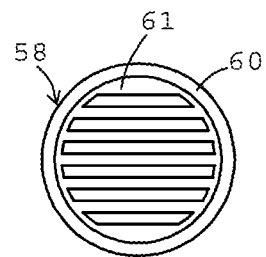

In FIG. 2, the fixing screws 41 and the nuts 49 which are the fastening points are the parts for attaching the undercover 31 to the vehicle body. The total number of the fixing screws 41 and the nuts 49 is limited by the relationship of the cycle time of the vehicle assembling line. The interval between the fastening points in the outer circumferential walls is restricted by the above limitation (that is, the interval cannot be narrower). Especially, in the present embodiment, the front and rear outer circumferential walls 36 and 38 in the outer circumferential walls 32, 34, 36 and 38 have a complicate shape for maintaining the predetermined clearance C to the vehicle body-opposite surface, and then the degree of freedom of setting the fastening points is limited by the position. That is, in a case that the interval between the fastening points is long, the concern that the hitting sound due to the interference between the outer circumferential walls and the vehicle body can be occurred by the large vibration while driving, becomes larger. In the present invention, the shock absorbing caps 58 are disposed between the adjacent pedestals 42, between the adjacent pedestals 42 and 44', and between the adjacent pedestals 46, which are the fixing screw members. Namely, the shock absorbing caps 58 are disposed between the fastening points of the undercover to the vehicle body. Under the condition that the total number of the fastening points and the setting portions of the fastening points are restricted, the 3 [mm] small clearance C between the undercover 31 and the vehicle body is achieved. In spite of the 3 [mm] small clearance C, even when the vertical vibration while driving is inputted, the problems such as the interference between the undercover 31 and the vehicle body, and the occurrence of the hitting sound due to the above interference can surely be prevented. That is, in a state that the shock absorbing caps 58 are disposed between the adjacent fastening points and the undercover 31 is attached to the vehicle body by the fixing screws 41 and the nuts 49, the disk top portions 60 of the shock absorbing caps 58 is elastically deformed and is maintained to be abutted to the opposite surface of the vehicle body, and the interference between the undercover and the vehicle body to the input of the vertical vibration while driving can be prevented and the occurrence of the hitting sound can also be prevented. FIG. 12 shows the above functions with respect to the boundary wall 32 of the undercover 31 and the shock absorbing caps 58 which are positioned between the adjacent flat-type screw pedestals 42. By screwing the fixing screws 41 to the screw holes 43 of the vehicle body through the screw pedestals 42, the top portion 60 of the shock absorbing cap 58 which is positioned at a midpoint between the adjacent pedestals 42 is pressed to the opposite surface of the vehicle body 29, and is slightly and elastically deformed. Thereby, the 3 [mm] small clearance C between the boundary wall 32 and the opposite surface of the vehicle body 29 can be maintained. Since the number of the fixing screws 42 and the nuts 49 which are the fixing screw means, that is, the number of the fastening points of the undercover 31 to the vehicle body is restricted, the interval between the adjacent fastening points can be considerably long and the concern that the interference between the undercover 31 and the vehicle body while driving can be occurred due to the small clearance. In the present invention, by setting the shock absorbing caps 58 disposed between the fixing screws 42 or between the nuts 49, regardless of the large interval length between the adjacent fastening points, the interference between the undercover 31 and the vehicle body and the hitting sound in the small clearance C of the undercover 31 to the vehicle body can be prevented. As shown in FIGS. 13A and 13B, because the materials of the grooves (the cutouts) 61 which are disposed at the top portion 60 of the shock absorbing cap 58 are removed, the grooves (the cutouts) 61 are the compressing margin when the top portion 60 is elastically deformed, and can be served as the efficient shock absorbing function by the elasticity of the shock absorbing cap 58.

Figure 14A:
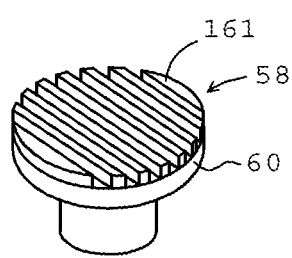
FIG. 14A is a perspective view of the shock absorbing cap according to another embodiment and FIG. 14B is a plan view of a top portion of the shock absorbing cap according to another embodiment.
Figure 14B:
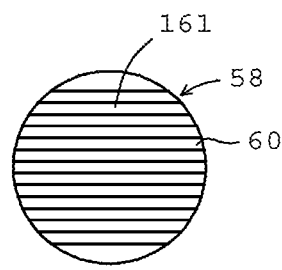

FIGS. 14A and 14B show another deformation shape of the top portion 60 of the shock absorbing cap 58. The grooves (the cutouts) 61 penetrate through the outer circumference of the top portion 60, and the top portion 60 has an easily collapse structure.

Figure 15A:
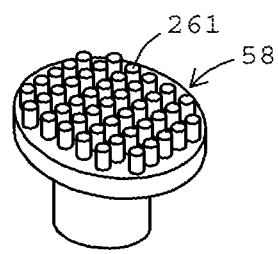
FIG. 15A is a perspective view of the shock absorbing cap according to still another embodiment.
Figure 15B:
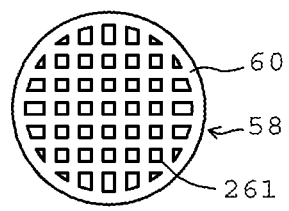
FIG. 15B is a plan view of a top portion of the shock absorbing cap according to still another embodiment.
Figure 15C:
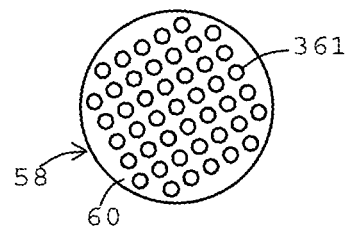
FIG. 15C is a plan view showing another arrangement example of a material removed portion in the top portion of the shock absorbing cap.

FIGS. 15A and 15B show the still another deformation shape of the top portion 60 of the shock absorbing cap 58. By removing the material of the top portion 60, plural pin-shape protrusions 261 in the top portion 60 are disposed. These protrusions 261 are served as the compressing margin when the top portion 60 is elastically deformed. FIG. 15C shows the pin-shape protrusions 361 which have another pattern for removing the material of the top portion 60.

The shock absorbing caps 58 are disposed between the adjacent screw pedestals or between the adjacent nut pedestals in the whole circumference of the undercover 31. In a state that the undercover 31 is attached to the vehicle body by the fixing screws 41 and the nuts 49, by elastically deforming the top portion 60 of the shock absorbing cap 58, the predetermined clearance C in the opposite surface between the undercover and the vehicle body can be maintained in the whole circumference of or the substantially whole circumference of the shield space S, and the interference between the undercover and the vehicle body can be prevented regardless of the small clearance. With respect to the outer circumferential wall 32, as described in the explanation of FIG. 12, the shock absorbing caps 58 are disposed between the flat-type screw pedestals 42, and are engaged with the bottom surface of the side sill 22 by the fixing screws (FIGS. 3, 4 and 5). The clearance C is maintained by the shock absorbing caps 58. With respect to the outer circumferential wall 34, the shock absorbing cap 58 is disposed between the flat-type screw pedestals 42 (FIG. 4). The floor center frame 28 is engaged with the bottom surface 28-2 of the vehicle interior side portion 28-1 by the fixing screw 41 (with respect to the engagement method by the fixing screw 41, refer to also FIG. 5 in which the engagement method to the side sill 22 is depicted) and the predetermined clearance can be maintained by the shock absorbing cap 58. With respect to the hollowed out portion 34' of the outer circumferential wall 34, the 3 [mm] preferred clearance to the vehicle body which is preferred to the sound insulation function cannot be maintained. Alternatively, in the inner side proximate to the hollowed out portion 34', the undercover 31 forms the ribs 40 having the height "$h_2$" which are disposed at both sides of the boss-shape screw pedestals 46. The undercover 31 fits the shock absorbing caps 58 to the cylindrical portions 40-1 disposed at the midpoint of the rib 40. Thereby, in a state that the undercover 31 is engaged with the bottom surface of the vehicle body side member 24, which is opposite to the screw pedestals 46, by the fixing screws 41, the predetermined clearance C can be maintained by the shock absorbing caps 58 (FIG. 8). With respect to the outer circumferential wall 36, the shock absorbing cap 58 is disposed at the midpoint of the outer circumferential wall 36. The relationship that the above shock absorbing cap 58 is sandwiched between the boss-shape nut pedestal 44' and the screw pedestal 46 is presented. As shown in FIG. 5, the predetermined clearance C between the outer circumferential wall 36 and the vehicle body-opposite surface (the floor panel 30) can be maintained by the shock absorbing cap 58, and the hitting sound is suppressed or is prevented. With respect to the outer circumferential wall 38, as shown in FIG. 7, the mutual position relationship between the outer circumferential wall 38 and the vehicle body-opposite surface is complicated. The shock absorbing cap 58 is fitted in the center portion of the outer circumferential wall 38 and is sandwiched between the flat-type screw pedestal 42 and the boss-shape screw pedestal 46. By the shock absorbing cap 58, the predetermined clearance C between the outer circumferential wall 38 and the vehicle body (the floor panel 30, the side member 24 and the center panel 28) can be maintained, and the hitting sound can be prevented by the shock absorbing function of the shock absorbing cap 58.

Figure 16:
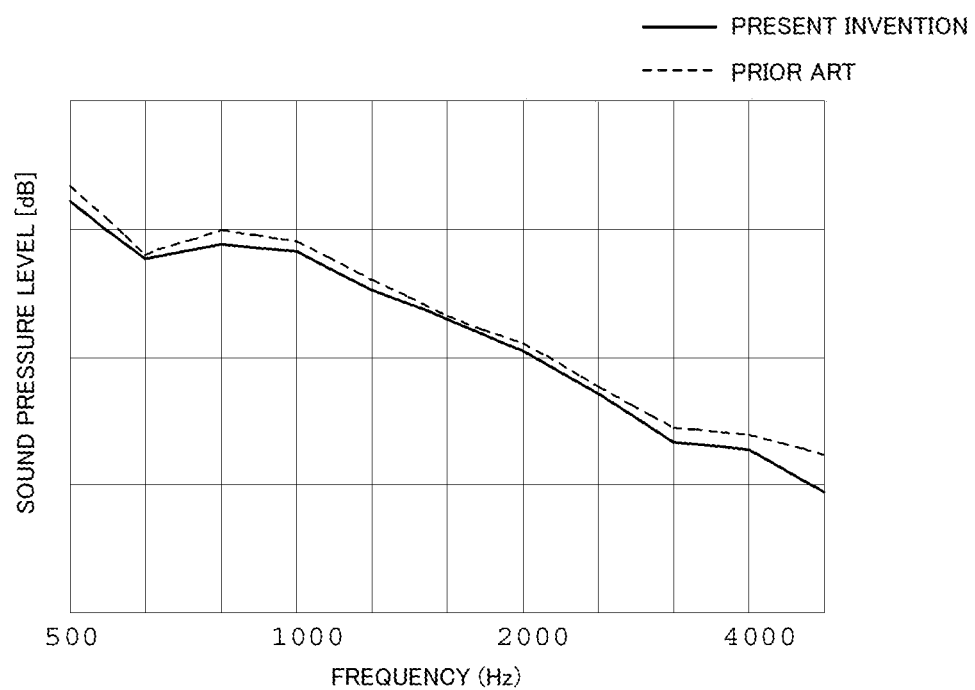
FIG. 16 is a graph showing a noise level of a vehicle interior in a running test of the vehicle in which the undercover according to the embodiment of the present invention is attached to the vehicle body, compared with the present invention and the prior art.

In a state that the undercover 31 is attached to the vehicle body by the fixing screws 41 and the nuts 39, the predetermined clearance C between the undercover 31 and the vehicle body-opposite surface can be maintained by disposing the respective shock absorbing caps 58 between the screw pedestals or between the nut pedestals along the outer circumference of the undercover 31, that is, the outer circumferential walls 32, 34, 36 and 38 (including the ribs 40 with respect to the hollowed out portion 34' of the outer circumferential wall 34). Thereby, the shield space, that is, the sound insulation space S which is maintained to the predetermined clearance C between the undercover 31 and the vehicle body-opposite surface along the whole circumference or the substantially whole circumference can be obtained. In a case that the specific value of the length of these predetermined clearance C is set to 3 [mm], the undercover is attached to the actual vehicle, and the vehicle runs with constant vehicle speed which is 40 [km/h], FIG. 16 shows actual measurement results of the sound pressure level at an occupant left position. In a case that the length (the central value) of the clearance C in the undercover 31 of the present invention is set to 3 [mm] around the whole circumference, the measurement result is shown by a solid line. As a comparison, in a case that the rigorous management to the clearance in the present invention is not performed (the length of the clearance around the outer circumference is set to 10 [mm]), the noise measurement test is performed. The actual measurement result in such a comparison test using the conventional undercover is shown by a broken line. Compared with the present invention and the prior art, it is understood that the present invention can clearly obtain the improved sound insulation characteristic. The present invention can realize the sound pressure level reduction with 1.1 [dB] as an average value in a frequency range of 1 [kHz] to 5 [kHz] which is an important range from the viewpoint of the noise reduction, compared with the prior art. In the above example, the predetermined value (the setting value) of the clearance C is set to 3 [mm]. If the length of the clearance C is narrower than 3 [mm], more excellent effect as the sound insulation effect will be realized. This effect is included to the idea (the scope) of the present invention.

Figure 17A:
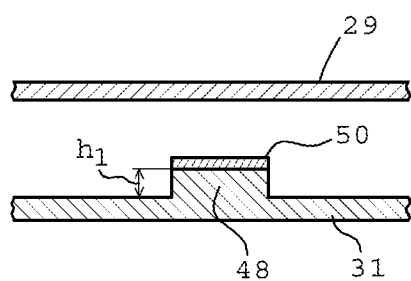
FIGS. 17A and 17B are cross-sectional views showing a nonwoven fabric tape for attaching to the outer circumferential wall of the undercover according to yet another embodiment of the present invention.
Figure 17B:
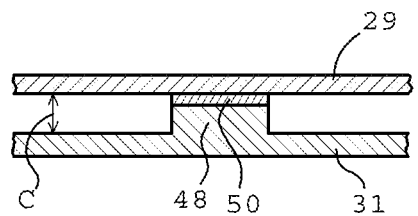

In the above embodiments, the shock absorbing caps 58 are fitted to the center portion between the adjacent screw pedestals 42 and between the adjacent nut pedestals 46 along the outer circumferential walls 32, 34, 36 and 38 (including the ribs 40 with respect to the hollowed out portion 34' of the outer circumferential wall 34) which are the outer circumference of the sound insulation space. When the undercover is attached to the vehicle body-lower surface by the fixing screws 41 and the nuts 49, the top portion 60 of the shock absorbing caps 58 is abutted to the vehicle body-opposite surface and is elastically deformed, and then the structure in which the small clearance is maintained is obtained. As an alternative of the shock absorbing cap 58, as shown in FIG. 17A, vehicle body pedestals 48 having a protruding shape form on the opposite surface to the vehicle body of the undercover 31. An attachment tape 50 including a nonwoven fabric layer having a required thickness can be affixed to the upper surface of the vehicle body pedestals 48 as the shock absorbing member. Explaining associated with FIG. 12 of the first embodiment, the vehicle body pedestals 48 are disposed at the midpoint of the adjacent flat-type pedestals 42 on the outer circumferential walls 32, 34, 36 and 38. The height of the vehicle body pedestals 48 is the same as the height "$h_1$" of the flat-type screw pedestals 42 in the first embodiment. As shown in FIG. 17B, by fixing the undercover 31 to the vehicle body 29 by the fixing screws, the vehicle body pedestals 48 is pressed to the opposite surface of the vehicle body 29 via the nonwoven fabric layer in the surface of the attachment tape 50, the setting clearance C between the outer circumferential walls 32, 34, 36 and 38 of the undercover 31 and the vehicle body-opposite surface can be maintained, and the occurrence of the hitting sound can be suppressed.

In the below portion of the vehicle interior, the embodiments of the present invention which are directed to form the sound insulation space S in which the small clearance between the undercover 31 and the vehicle body around the whole circumference of or the substantially whole circumference of the undercover 31 is maintained, have been explained. The scope of the present invention is not limited to such embodiments. That is, the original gist of the present invention is that the interference between the undercover and the vehicle body due to the vibration while driving is not occurred by disposing the shock absorbing members between the adjacent fastening points in the propagating portions of the noise, without changing the number of the fastening points, and the small clearance between the undercover and the vehicle body is maintained. For example, in a case that the countermeasure of propagating the noise from the front portion of the undercover is required, that is, in a case that the n noise suppression against the propagation of the noise is required for the local portion, the clearance between only the noise propagation portion in the undercover and the vehicle body is small. In order to avoid the interference between the undercover and the vehicle body due to the vibration and the like while driving, the shock absorbing members 58 are only disposed between the adjacent fastening points in the noise propagation portion. For example the shock absorbing members 58 are only disposed between the pedestals 42 of the fixing screw member, between the pedestals 42 and 44' of the fixing screw member, and between the pedestals 46 of the fixing screw member, along the front portion of the outer circumferential walls of the undercover. In the rest portions where the noise propagation is not significant, the large clearance in which the interference cannot be occurred is still maintained. Even the above structure can achieve the object of the present invention.

EXPLANATION OF REFERENCE NUMERALS

10 front wheels
12 rear wheels
14 sub frame
16 exhaust gas tubes
18 fuel tank
20 mufflers
22 side sills
24 side members
28 floor center frame
29 vehicle body
31 undercover
32, 34, 36, 38 outer circumferential wall of the undercover
33 bottom surface of the undercover
34' hollowed out portion of the outer circumferential wall
39, 40 reinforcing rib
41 fixing screw (fixing screw member of the present invention)
42 flat-type screw pedestal (pedestal for fixing screw member of the present invention)
44, 44' boss-shape nut pedestal (pedestal for fixing screw member of the present invention)
46 boss-shape screw pedestal (pedestal for fixing screw member of the present invention)
47 stud
49 nut (fixing screw member of the present invention)
50 attachment tape (shock absorbing member of the present invention)
58 shock absorbing cap (shock absorbing member of the present invention)
60 disk top portion of the shock absorbing cap
61 groove (cutout) of top portion of the shock absorbing cap (material removed portion of the present invention)
62 cylindrical leg portion of the shock absorbing cap
C setting clearance between the undercover and a vehicle
S sound insulation space

The invention claimed is:

1. A structure for attaching an undercover, which rectifies airflow under a floor of a vehicle while driving, to a vehicle body by screws,
wherein said undercover comprises:
pedestals for screw-fastening members which work as fastening points to attach said undercover for said vehicle body; and
shock absorbing members which are disposed between adjacent pedestals to keep a clearance of noise entrance between said undercover and said vehicle body small, and provide a noise propagation countermeasure which prevents an interference between said undercover and said vehicle body to vibration while driving, without increasing the number of fastening points of said undercover with said vehicle body, and
wherein said shock absorbing members are kept to abut with an opposite surface of said vehicle body in a state that said undercover is attached with a lower surface of said vehicle body by fastening said screws through said pedestals.

2. The structure for attaching an undercover to a vehicle body according to claim 1,
wherein said undercover further comprises rib molded portions which are disposed at non outer circumferential portions of said undercover and are served as attachments for attaching said shock absorbing members.

3. The structure for attaching an undercover to a vehicle body according to claim 2,
wherein said shock absorbing members are molded by a synthetic resin having elasticity, and comprise:
a tip portion abutting on said vehicle body; and
a leg portion inserted to a bottomed cylindrical portion of said undercover.

4. The structure for attaching an undercover to a vehicle body according to claim 3,
wherein said tip portion of each said shock absorbing members which opposes to said vehicle body comprises a material removed-portion which works as a compressing margin for elastical deforming when said tip portion is abutted to said vehicle body.

5. The structure for attaching an undercover to a vehicle body according to claim 2,
wherein said undercover is attached to form a sound insulation space with a bottom surface of said vehicle body below a cabin of said vehicle around a whole circumference or said substantially vehicle floor,
wherein said clearance opposes to said body surface around a whole circumference or a substantially whole circumference of said undercover and is set to a predetermined distance, and
wherein said shock absorbing members are disposed between adjacent fastening points along a whole circumference of said undercover.

6. The structure for attaching an undercover to a vehicle body according to claim 1,
wherein tips of said shock absorbing members which abut on said opposite surface of said vehicle body are made of an elastic body.

7. The structure for attaching an undercover to a vehicle body according to claim 6,
wherein said shock absorbing members are molded by a synthetic resin having elasticity, and comprise:
a tip portion abutting on said vehicle body; and
a leg portion inserted to a bottomed cylindrical portion of said undercover.

8. The structure for attaching an undercover to a vehicle body according to claim 7,
wherein said tip portion of each said shock absorbing members which opposes to said vehicle body comprises a material removed-portion which works as a compressing margin for elastical deforming when said tip portion is abutted to said vehicle body.

9. The structure for attaching an undercover to a vehicle body according to claim 6,
wherein said undercover is attached to form a sound insulation space with a bottom surface of said vehicle body below a cabin of said vehicle around a whole circumference or said substantially vehicle floor,
wherein said clearance opposes to said body surface around a whole circumference or a substantially whole circumference of said undercover and is set to a predetermined distance, and
wherein said shock absorbing members are disposed between adjacent fastening points along a whole circumference of said undercover.

10. The structure for attaching an undercover to a vehicle body according to claim 1,
wherein said shock absorbing members are molded by a synthetic resin having elasticity, and comprise:
a tip portion abutting on said vehicle body; and
a leg portion inserted to a bottomed cylindrical portion of said undercover.

11. The structure for attaching an undercover to a vehicle body according to claim 10,
wherein said tip portion of each said shock absorbing members which opposes to said vehicle body comprises a material removed-portion which works as a compressing margin for elastical deforming when said tip portion is abutted to said vehicle body.

12. The structure for attaching an undercover to a vehicle body according to claim 11,
wherein said undercover is attached to form a sound insulation space with a bottom surface of said vehicle body below a cabin of said vehicle around a whole circumference or said substantially vehicle floor,
wherein said clearance opposes to said body surface around a whole circumference or a substantially whole circumference of said undercover and is set to a predetermined distance, and
wherein said shock absorbing members are disposed between adjacent fastening points along a whole circumference of said undercover.

13. The structure for attaching an undercover to a vehicle body according to claim 10,
wherein said undercover is attached to form a sound insulation space with a bottom surface of said vehicle body below a cabin of said vehicle around a whole circumference or said substantially vehicle floor,
wherein said clearance opposes to said body surface around a whole circumference or a substantially whole circumference of said undercover and is set to a predetermined distance, and
wherein said shock absorbing members are disposed between adjacent fastening points along a whole circumference of said undercover.

14. The structure for attaching an undercover to a vehicle body according to claim 1,
wherein said shock absorbing members with a shock absorbing layer formed on an adhesive tape are attached to said undercover.

15. The structure for attaching an undercover to a vehicle body according to claim 1, wherein said undercover is attached to form a sound insulation space with a bottom surface of said vehicle body below a cabin of said vehicle around a whole circumference or said substantially vehicle floor, wherein said clearance opposes to said body surface around a whole circumference or a substantially whole circumference of said undercover and is set to a predetermined distance, and wherein said shock absorbing members are disposed between adjacent fastening points along a whole circumference of said undercover.

16. The structure for attaching an undercover to a vehicle body according to claim 15, wherein said undercover has a partially hollowed out shape and comprises rib portions disposed along inside said hollowed out portion for pedestals of attaching said shock absorbing members.

* * * * *